(12) United States Patent
Mandl et al.

(10) Patent No.: US 6,871,899 B2
(45) Date of Patent: Mar. 29, 2005

(54) TOP FOR A CONVERTIBLE VEHICLE

(75) Inventors: Thomas Mandl, Deggendorf (DE); Walter Pecho, Ringelai (DE); Werner Freimuth, Bodenmais (DE); Klaus Obendiek, Passau (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 179 days.

(21) Appl. No.: 10/334,244

(22) Filed: Dec. 31, 2002

(65) Prior Publication Data

US 2003/0146642 A1 Aug. 7, 2003

(30) Foreign Application Priority Data

Jan. 5, 2002 (DE) .......................................... 102 00 221
Jul. 31, 2002 (EP) ............................................. 02017171

(51) Int. Cl.$^7$ ................................................. B60J 7/12
(52) U.S. Cl. .............. 296/107.12; 296/116; 296/107.09
(58) Field of Search ........................ 296/107.09, 107.12, 296/116, 146.14, 107.01, 117, 121, 107.11, 107.07

(56) References Cited

U.S. PATENT DOCUMENTS

| | | | | |
|---|---|---|---|---|
| 4,543,747 A | | 10/1985 | Kaltz et al. | |
| 4,784,428 A | * | 11/1988 | Moy et al. | 296/122 |
| 5,749,619 A | * | 5/1998 | Mentink | 296/117 |
| 5,816,644 A | * | 10/1998 | Rothe et al. | 296/117 |
| 6,048,021 A | * | 4/2000 | Sautter, Jr. | 296/117 |
| 6,347,827 B1 | * | 2/2002 | Maass | 296/107.09 |
| 6,422,636 B2 | * | 7/2002 | Mentink | 296/107.01 |

FOREIGN PATENT DOCUMENTS

| | | |
|---|---|---|
| DE | 3444593 | 6/1986 |
| DE | 4320603 A1 | 1/1995 |
| DE | 29713555 U1 | 12/1998 |
| DE | 19912355 C1 | 9/2000 |
| DE | 19912358 A1 | 9/2000 |
| DE | 29922812 U1 | 9/2000 |
| DE | 19913033 | 10/2000 |
| DE | 10113427 A1 | 10/2002 |

* cited by examiner

Primary Examiner—Dennis H. Pedder
Assistant Examiner—Greg Blankenship
(74) Attorney, Agent, or Firm—Davidson, Davidson & Kappel, LLC

(57) ABSTRACT

A top for a convertible vehicle moveable between an open state and a closed state: The top includes a flexible top fabric, a top linkage, a laterally disposed top-cloth tensioning bracket, and a fin link including an inherently rigid structural part configured to bear longitudinal and tensile loads. The fin link is connected in an articulated manner on a rear end of the top-cloth tensioning bracket. In the closed state, the top-cloth tensioning bracket is part of a fin of the top and the fin link supports the top-cloth.

31 Claims, 9 Drawing Sheets

TOP FOR A CONVERTIBLE VEHICLE

Priority is claimed to German Patent Application No. 102 00 221.5-21, filed Jan. 5, 2002, and to European Patent Application 02017171.6, filed Jul. 31, 2002, both of which are incorporated by reference herein.

BACKGROUND INFORMATION

The present invention relates to a top for a convertible, comprising a flexible top fabric, a top linkage and a laterally arranged top-cloth tensioning bracket, the top-cloth tensioning bracket, in a closed state of the top, being part of an essentially fin-like, rear-side formation of the top.

The construction of modern convertible vehicles increasingly requires individual designs for the tops without having to incur disadvantages with regard to the service life, the dimensional stability or the volume of storage space taken up when the top is open. Convertible tops having fin-like, rear-side end regions which, in the closed state of the top, impart a particularly sporty appearance are desired, in particular, but lead to disadvantages in the realization especially of the fin-like end regions.

In addition, it is increasingly desirable for the rear window of the vehicle to be designed as a rigid window consisting of glass or plastic. In the case of many top arrangements, in particular those mentioned above, rigid rear windows of this type cannot easily be integrated into the top fabric, since there has to be a concern that the window will be damaged during an opening or closing movement of the top.

German Patent document DE 43 20 603 C2 describes a motor vehicle having a pivotable hard-shell collapsible top in which a rear window can be moved separately from the hard-shell collapsible top. In this case, in a closed state of the top, the rear window can be retracted into a holder on the rear hard-shell top part. A sufficiently precise orientation of the rear window with respect to a holder, which is complementary to it, in the rear-side roof part, is ensured in principle by the fact that the top is a hard-shell collapsible top. Such a simple solution is not possible if a rear window is integrated into a flexible folding top.

German Patent document DE 199 12 355 C1 describes a convertible vehicle having a retractable rear window, in which the top of the convertible vehicle is designed as a flexible folding top and the rear window is held in a rear window frame connected to the folding top. In this case, the rear window, including its drive, is connected to the rear window frame and is accordingly pivoted at the same time as the folding top is opened or closed and is also stored away together with the folding top in the rear region of the vehicle. It is therefore not possible, in an open state of the top, to raise the rear window in order thereby, for example, to take on the function of a windbreak. In addition, in the top shown, fin-shaped end regions which are formed from top cloth and are arranged on the rear side and laterally are provided. In the practical realization here, the upper edge of the fin-shaped end regions, which edge runs obliquely downward and rearward, is not formed or supported by linkage parts, but is merely formed by free, tensioned cloth or, if appropriate, is supported by a cable stretched below the cloth, in which case the tension is introduced into the top cloth by tensioning-bar elements in each case forming the base of the end regions. However, these fin-like end regions are actually thereby constructed inadequately, since, in particular during a relatively long operating period of the top, the top cloth or the cable supporting the slope becomes extended in such a manner that the contour of the fin-shaped end regions collapses. In addition, the inadequately supported cloth even encourages the end regions to vibrate in the head wind, which may result in the top cloth becoming worn. In addition, the deficient support and guidance of the top fabric in the region in question results in an undefined folding of the top fabric during an opening procedure.

German Patent document DE 297 13 555 U1 describes a top for a convertible vehicle, in which the rear-side top-cloth tensioning bracket has fin-shaped extents shaping the top cloth, in which case an upper edge of the fin-shaped region of the top cloth can be supported by a tensioning cable or a telescopic rod. Such telescopic rod, unlike a link in a technical meaning, cannot be subjected to tensile and longitudinal loads. The telescopic rod does not form a functional part of a positively controlled link mechanism of the top and is not adding to a structural stability of the closed top.

German Patent document DE 199 12 358 A1 describes a top for a convertible vehicle, in which the rear-side top-cloth tensioning bracket has fin-shaped extents shaping the top cloth, in which case a link, which is articulated approximately centrally, in the direction of travel, on the fin-shaped extent of the tensioning bracket, forms, in the closed state of the top, an angle of approximately 45° with the tensioning bracket and, in the open state of the top, is pivoted approximately parallel onto the tensioning bracket. Means for supporting or shaping upper edges of the top cloth in the region of the fin-shaped extents are not provided.

German Patent document DE 299 22 812 U1 describes a top for a convertible vehicle, in which the rear-side top-cloth tensioning bracket has fin-shaped extents shaping the top cloth. Means for supporting or shaping upper edges of the top cloth in the region of the fin-shaped extents are not provided.

German Patent document DE 101 13 427 A1 describes a top for a convertible vehicle, in which a rear window is designed in a manner such that it can be detached from the rest of the top, and in the open state of the top, can be used as a wind barrier on the vehicle.

SUMMARY OF THE INVENTION

An object of the present invention is to provide a top for a convertible vehicle, in which the design of rear-side fins of the top is made possible in an advantageous manner.

A top for a convertible vehicle according to the present invention comprises a flexible top fabric, a top linkage and a laterally arranged top-cloth tensioning bracket, the top-cloth tensioning bracket, in a closed state of the top, being part of an essentially fin-like, rear-side formation of the top, a fin link, which is fixed in an articulated manner on the rear side of the top-cloth tensioning bracket, wherein the fin link, in the closed state of the top, acts in a supporting manner on the top cloth, wherein the fin link being designed as an inherently rigid structural part which can be subjected to tensile and longitudinal loads.

An advantageous effect achieved thereby is that an obliquely downwardly sloping upper edge of the rear-side fins can be formed in a particularly precise and permanently dimensionally stable manner, it being possible, during an opening procedure of the top, to pivot the fin link in a space-saving manner by the fin link being articulated on the top-cloth tensioning bracket. Those lateral surfaces of the fins which are defined by the top cloth can be stretched particularly tautly by the dimensionally rigid fin link.

In a preferred embodiment of a top according to the present invention, in an open state of the top, the fin link is arranged parallel to the top-cloth tensioning bracket, as a result of which the rear-side fins are transferred in a particularly space-saving manner into a flat structure consisting of links and top cloth.

A tensioning rod and a counterpart are preferably provided and, in the closed state of the top, are in a position beyond the dead center with respect to each other and support the top-cloth tensioning bracket. This ensures good and permanent tensioning of the closed top.

A bow link is preferably also provided, the bow link, the fin link and the top-cloth tensioning bracket, in the closed state of the top, defining a triangle, and an upper segment of a rear window frame being connected rigidly to the bow link, it being possible for a rear end region of the top fabric to be fixed on the upper segment. The exact positioning of the upper segment which is thus made possible permits, in a particularly simple manner, the provision of a rigid rear window which can be moved separately from the top.

A lateral element is particularly advantageously also provided, the lateral element forming a lateral frame region of a rear window, which region is orientated essentially vertically in the closed state of the top. Among other things, the effect achieved by the lateral element is that the rigid rear window can be sealed, in the closed state of the top, against the flexible top fabric by means of a rear window frame comprising the lateral element, but at the same time, pivoting of the rear window frame causes the rear window to be raised even in the open state of the top, as a result of which it can take on, for example, the function of a windbreak.

In this case, the rear window, in the closed state of the top, advantageously engages, in its raised state, in a groove-like recess in the rear window frame, as a result of which sealing of the rear window against the top is made possible in a simple manner by means of sealing elements.

In a preferred embodiment of a top according to the present invention, the top linkage has, in a rear-side end region, two top-cloth tensioning brackets which are in each case arranged laterally, in which case the rear window frame is arranged between the top-cloth tensioning brackets. This creates a particularly attractive possibility of designing a top according to the present invention where the two lateral top-cloth tensioning brackets shape the top cloth in the manner of two fins which are arranged at the sides of the rear window and are directed toward the rear of the vehicle.

The rear window frame of the top according to the present invention advantageously comprises a plurality of segments which are movable with respect to one another, two of the segments in each case being arranged laterally and, in the closed state of the top, holding side edges of the rear window in a tight-fitting manner, and an upper segment extending transversely to the direction of travel, and, in the closed state of the top, holding an upper edge of the rear window in a tight-fitting manner. By this means, in the closed state of the top, it is now possible in a simple manner to store away, in a particularly space-saving manner the top linkage together with the rear window frame belonging to the top linkage.

The rear window is particularly advantageously mounted in a housing which is connected to the convertible vehicle by being fixed on the bodywork, with the result that the rear window is not moved during an opening or closing movement of the top. In addition, this results in a simple manner in the possibility of the rear window being movable relative to the housing, and therefore relative to the convertible vehicle, by means of a guide rail and a drive which is designed, for example, as a cable drive, hydraulic drive, mechanical drive with an electric motor or drive via a rising shaft.

The top linkage is advantageously designed as a positively controlled link mechanism, so that an opening and closing movement of the top can be automated by means of a driving device. In this case, the link mechanism particularly advantageously has, on each side of the vehicle, a main link, a central frame part and a front frame part. A front bow is also advantageously provided here in a known manner on the front frame part, the front bow, in the closed state of the top, being fixed detachably on a front window frame.

The top linkage advantageously comprises two positively controlled link mechanisms, the rear window frame being part of one of the link mechanisms. This makes it possible for a positively controlled opening movement together with a particularly optimized packing position of the top which has been stored away to be achieved even for a complicated top linkage.

The top linkage of a top according to the present invention preferably has a main bearing unit by means of which the top can be attached as an entire unit to a convertible vehicle.

Further advantages and features of a top according to the present invention emerge from the preferred exemplary embodiment described below and from the claims.

BRIEF DESCRIPTION OF THE DRAWINGS

A preferred exemplary embodiment of a top according to the present invention will be described below and explained in greater detail with reference to the attached drawings, in which.

DETAILED DESCRIPTION OF A PREFERRED EMBODIMENT

Figure 1:
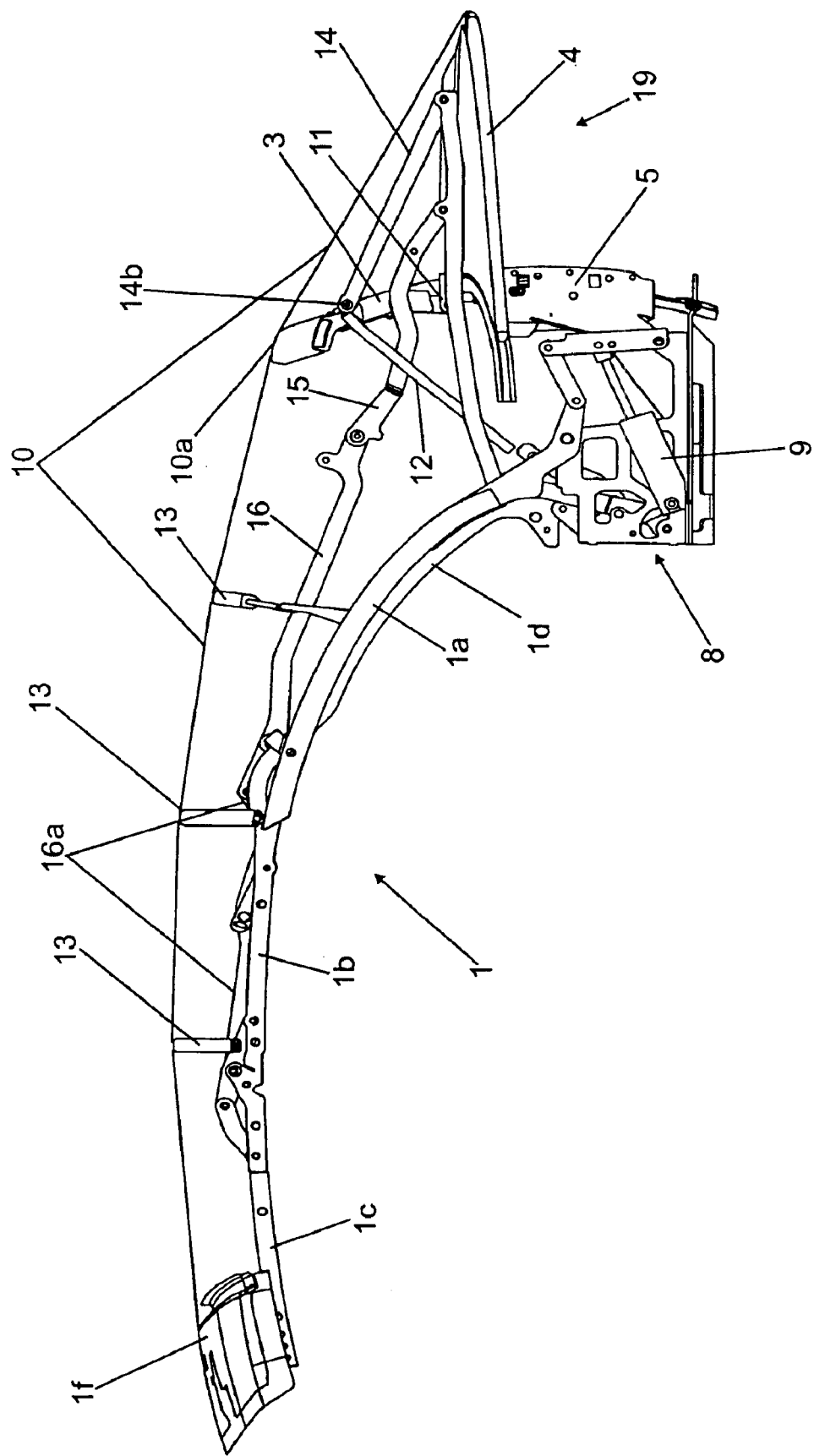
FIG. 1 shows a schematic side view of a top according to the present invention for a convertible vehicle in a closed state of the top.

As FIG. 1 shows, a top according to the present invention comprises a top linkage 1 which is designed as a positively controlled link mechanism and is attached in an articulated manner to a central main bearing unit 8. The main bearing unit 8 comprises at least one driving unit 9 which is designed in a known manner as a linear driving cylinder. The top linkage comprises, inter alia, a main link 1a, a central frame part 1b and a front frame part 1c, a front bow 1f being fixed on the front frame part 1c. The front bow 1f is designed as a rigid shell part and comprises a fastening device by means of which the front bow 1f can be fixed in a detachable manner on a front window frame (not shown). Starting from the front bow 1f, a flexible top fabric 10 extends over the top linkage, the top fabric 10 being supported on a plurality of bows 13. On the rear side, the top has a top-cloth tensioning bracket 4 on which the top fabric 10 is likewise fixed. From the rear-side view of the top according to FIG. 3, it is clear that a respective top-cloth tensioning bracket 4 is provided on each side of the vehicle, in which case a rear window frame 3 is arranged between the top-cloth tensioning brackets. The top fabric 10 is fixed both on each of the top-cloth tensioning brackets 4 and on the rear window frame 3. By virtue of the fact that, firstly, the top fabric is fixed in a rear end region 10a on the rear window frame and, secondly, also extends in the lateral vehicle regions over the top-cloth tensioning brackets 4, which are formed in a fin-like manner, an esthetically particularly interesting design of a top according to the present invention is achieved. In this case, the rear window frame 3 is used, firstly for fixing the top fabric 10 in a tight-fitting manner and, secondly, for holding a rear window 2 in a tight-fitting manner in the closed state of the top.

Figure 3:
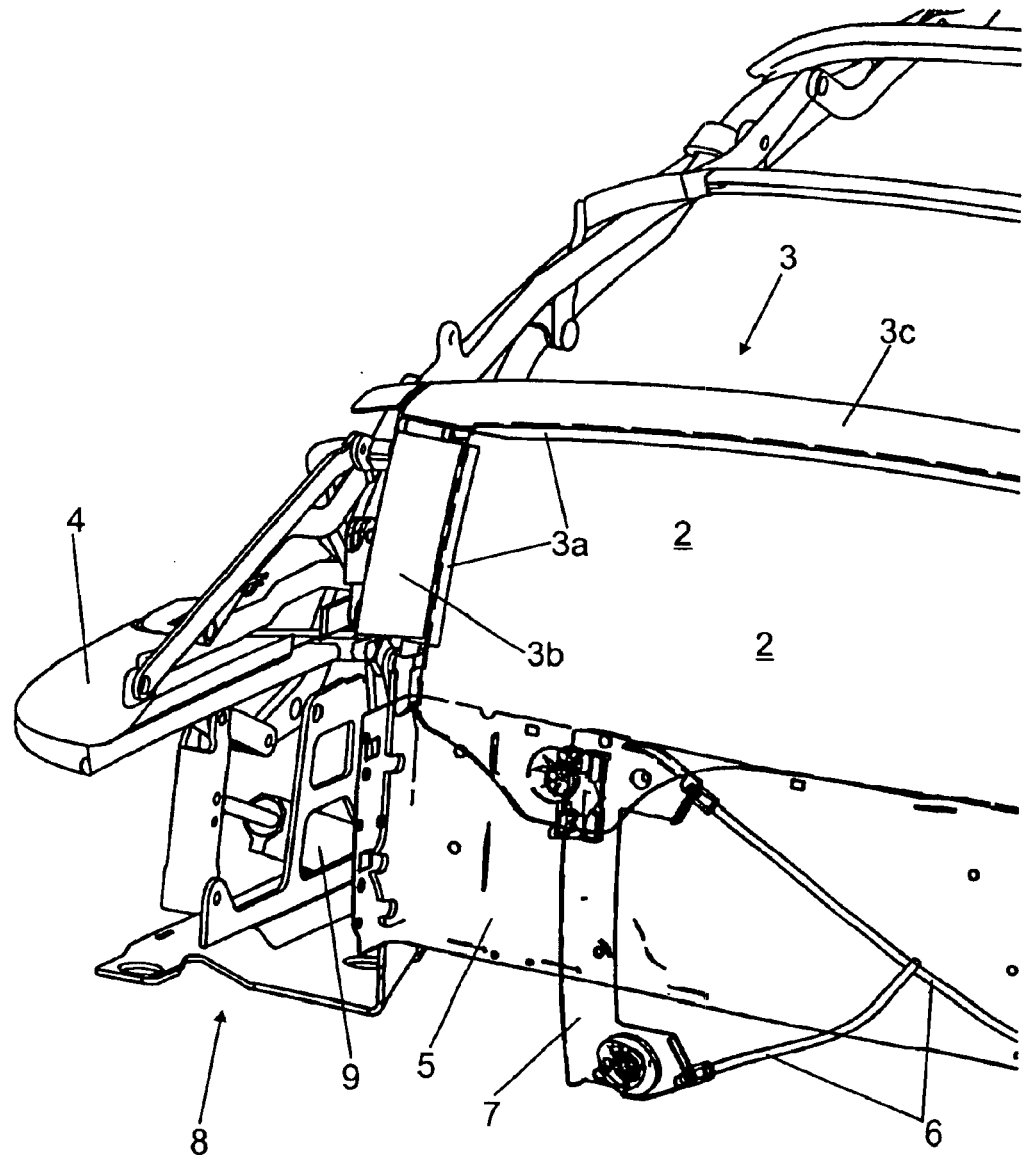
FIG. 3 shows a perspective view of the top from FIG. 1 from the rear in a closed state of the top with the rear window raised.

The rear window 2 is held on a housing 5 which is fixed in turn on the main bearing unit 8 of the top, so that the housing 5 is connected in its entirety to the convertible vehicle by being fixed on the bodywork. The rear window 2 can be raised and lowered relative to the housing 5 by means of a guide rail 7 provided on the housing 5 and a cable drive 6. FIG. 3 shows a closed state of the top in which the rear window 2 is raised and engages in the rear window frame 3. The rear window frame 3 has groove-like recesses 3a which grip around the rear window 2 and, in addition, comprise in a known manner sealing lips for sealing the rear window 2.

Figure 4:
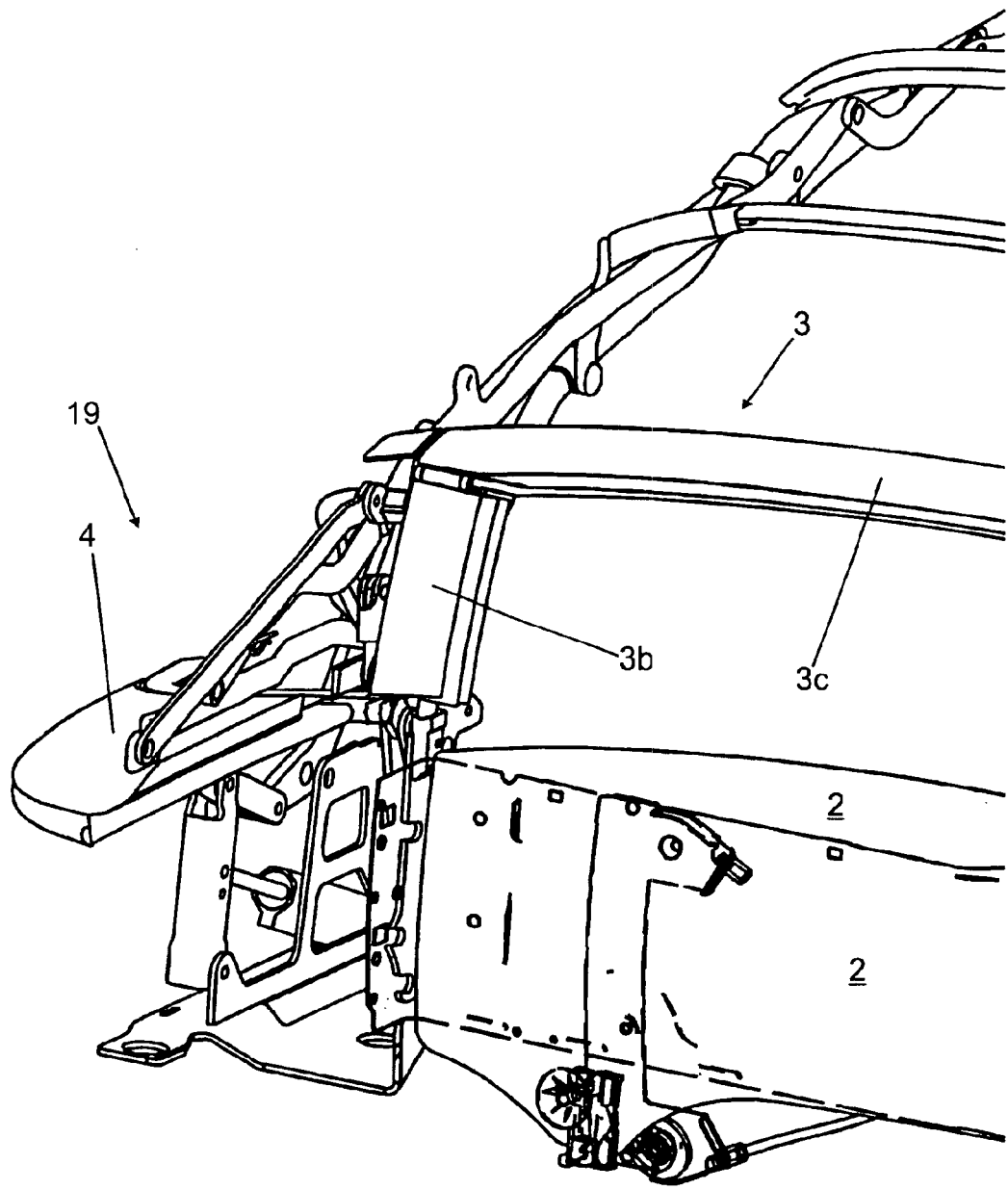
FIG. 4 shows the top from FIG. 3 with the rear window lowered.
Figure 5:
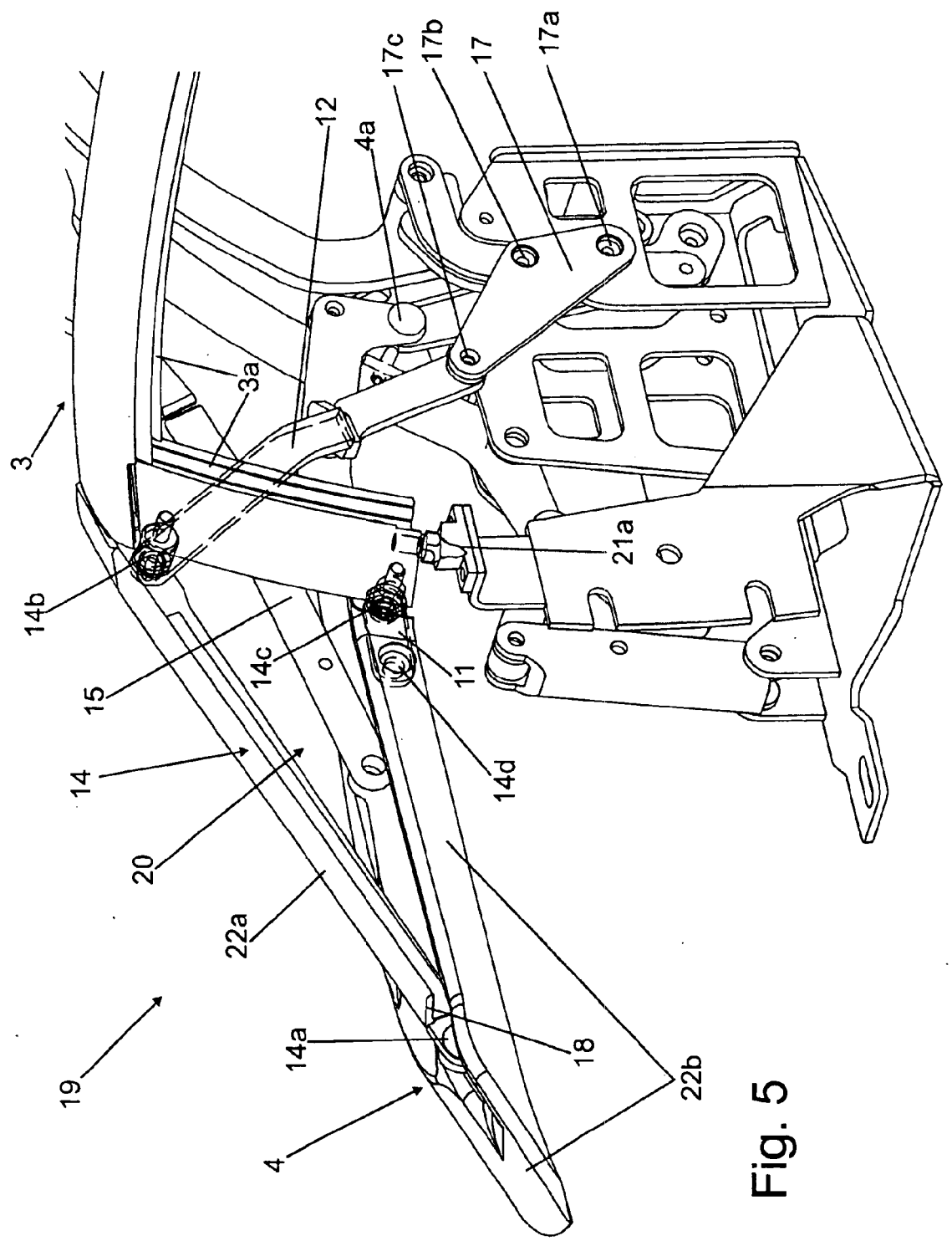
FIG. 5 shows a perspective view from the rear of a top according to the present invention in a closed state of the top.

FIG. 4 shows the top in a closed state with the rear window 2 in a lowered state. This combination of top and rear-window position advantageously permits the convertible vehicle to be loaded with long, narrow goods for transportation. A further advantage of a rear window which can be lowered in the closed state of the top also involves the possibility of particularly rapidly acquiring free vision to the rear if the rear window is, for example, misted up or iced over. Not least, however, this provides a further alternative of ensuring good ventilation of the vehicle without having to completely open the convertible top.

The illustrations of the top according to the present invention in FIG. 5 to FIG. 9 show the top omitting the housing 5 and the rear window 2. The mechanical embodiment shown in FIG. 5 to FIG. 9 is functionally identical to the embodiment according to FIG. 1 to FIG. 4; only the precise design of some of the components differs slightly. In particular, the top-cloth tensioning bracket 4 and the fin link 14 are illustrated in FIG. 1 to FIG. 4 with detachable shaped parts 22a, 22b omitted in order to better clarify their kinematic function and articulation. FIG. 5 to FIG. 9 are complete illustrations together with the shell parts 22a, 22b.

In particular, in the formation of the linkage parts according to FIG. 5 to FIG. 9, i.e. in the complete formation including the abovementioned attachable shaped part 22a, a fin link 14 has a profiling 18 which makes it possible, in a particularly advantageous manner, to fix or else to guide the top cloth on the fin link 14. By means of such fixing and/or guiding and supporting by rigid linkage parts, fins 19 which are arranged at the side of the rear window and are directed toward the rear of the vehicle can be formed in a manner which permits a taut and well-contoured shaping of the top cloth used to form at least parts of the outer surfaces of the fins. The fin link 14 which supports the cloth and, in the closed state of the top, stands obliquely in space and slopes downward toward the vehicle rear, is designed as an inherently rigid structural part. This not only ensures good formation of the fins 19, but also a permanent shaping, even with age-induced expansion of the top cloth.

In order to avoid disadvantages with regard to a space-saving storage of the open top because of the use of the rigid fin link 14, the fin link 14, which stands obliquely in space in the closed state of the top, is integrated into the overall kinematics of the top by means of points of articulation and further link elements in such a manner that when the top is opened, the link can be pivoted in a positively controlled manner and, in an open state of the top, can be stored in a space-optimized manner by positioning it parallel to other linkage parts.

The top-cloth tensioning brackets 4 are mounted in a manner such that they can pivot about a joint 4a and the fin link 14 is fixed in an articulated manner in a joint 14a on the rear side of the top-cloth tensioning bracket 4. In addition, approximately halfway along the top-cloth tensioning bracket a tensioning rod 15 is fixed in an articulated manner on the top-cloth tensioning bracket. The fin link 14 is rotatably connected at the other end, in a rotary joint 14b, to a bow link 12 and, at the same time, to a lateral element 3b of the rear window frame 3. The lateral element 3b of the rear window frame is connected in an articulated manner at the other end, in a joint 14c, to an intermediate link 11 which, in turn, is connected in an articulated manner, in a joint 14d, to the top-cloth tensioning bracket 4. All in all, a four-bar linkage 20 is formed by the elements top-cloth tensioning bracket 4, fin link 14, lateral element 3b of the rear window frame 3 and intermediate link 11, by means of their articulated connections in the rotary joints 14a, 14b, 14c and 14d. An upper segment 3c of the rear window frame 3, on which a rear end region 10a of the top fabric 10 is fixed at the same time in the manner of a corner bow, is connected rigidly to the bow link 12. Since the lateral element 3b of the rear window frame 3 can be pivoted relative to the bow link 12, the lateral element 3b of the rear window frame 3 and the corner-bow-like, upper element 3c of the rear window frame 3 can therefore also be moved with respect to each other. At its end facing away from the corner bow, the bow link 12 is connected in an articulated manner, in a joint 17c, to a link plate 17. The link plate 17 is articulated on the main bearing unit 8 in a further joint 17a. In addition, a roof frame link 1d, which, in the closed state of the top, is arranged parallel to the main link 1a, is connected in an articulated manner to a bent control link 1e which is held in an articulated manner at the other end, in a joint 17b on the link plate 17.

The four-bar linkage 20, the bow link 12 and therefore the upper end 3c of the rear window frame 3 and the tensioning rod 15 together with a counterpart 16 assigned to it (see FIG. 1) can now be pivoted without the further linkage parts of the top linkage 1 having to be moved. All in all, according to the preferred exemplary embodiment, the top according to the present invention is therefore divided into two separate link mechanisms which are in each case positively controlled. In addition, as a particularly advantageous design, coupling of the two positively controlled link mechanisms is provided by the counterpart 16 being connected via further control links 16a to the front frame part 1c bearing the front bow 1f. By this means, a positively controlled, simultaneous pivoting upward of the front bow 1f together with the top-cloth tensioning bracket 4 is realized. At the beginning of a top-opening movement, this enables the top fabric 10 to be simultaneously relaxed both in the rear region and in the front region of the top. Since the top cloth is fixed on the upper segment 3c of the rear window frame 3, relaxation, initially merely of the rear side, of the top fabric would result in the front linkage parts being temporarily subjected to unequal loads by tensioning forces, which involves the risk in the long term of linkage parts becoming jammed.

The present invention functions as follows:

Starting from the closed state of the top according to FIG. 1, the rear window 2 is first of all lowered in order to initiate a top-opening movement. This enables the rear window frame 3 to be moved without causing damage to the rear window 2. The previously described link mechanism, which is associated with the activation of the rear window frame 3 and of the top-cloth tensioning bracket 4, is then pivoted. This pivoting advantageously takes place using a separate driving device (not illustrated). In the process, first of all the tensioning rod 15 and its counterpart 16 are moved from a position beyond the dead center point, which exists in the closed state of the top, so that the tensioning rod 15 and its counterpart 16 pivot away downward according to FIG. 1. In the process, the bow link 12 is pivoted in anti-clockwise direction according to FIG. 1 and in clockwise direction according to FIG. 5. As a result, the fin link 14 is subjected to a tensile load. This results in the top-cloth tensioning bracket 4 being pivoted upward and, in a first section of movement, in a linear movement of the lateral element 3b of the rear window frame 3 away from a support 21a on which the lateral element 3b is held by means of a centering pin 21b in the closed state of the top. During this positively controlled movement, the fin link 14 pivots about the rotary joint 14a in the direction of the top-cloth tensioning bracket 4. During the movement of the lateral element 3b relative to the top-cloth tensioning bracket 4, the intermediate link 11 ensures a length compensation, so that the positively controlled movement is actually possible. In summary, this first section of the top-opening movement can also be described by the elements fin link 14, bow link 12 and top-cloth tensioning bracket 4 having originally essentially defined a triangle (see FIG. 8) and, after their pivoting, being arranged parallel (see FIG. 9). In technical terms, this likewise involves the movement of a four-bar linkage which comprises the joints 14a, 14b, 4a and 17c. During this above-described first step of the top-opening movement, the link plate 17 is not pivoted. Simultaneously to the described process, the movement of the counterpart 16 also causes the pivoting upwards of the front bow if to be initiated, as a result of which the top fabric 10 is relaxed over its entire length directly after the top-opening movement is initiated.

After a first step of the top-opening movement, the top-fabric tensioning brackets 4 are in a pivoted-upward state. See FIG. 6. In this case, firstly, the top fabric 10 is relaxed and secondly, the possibility is created in the rear region of the vehicle of opening a rear lid in a known manner counter to the direction of travel in order to release a storage space for the top which is folded together later on.

Figure 6:
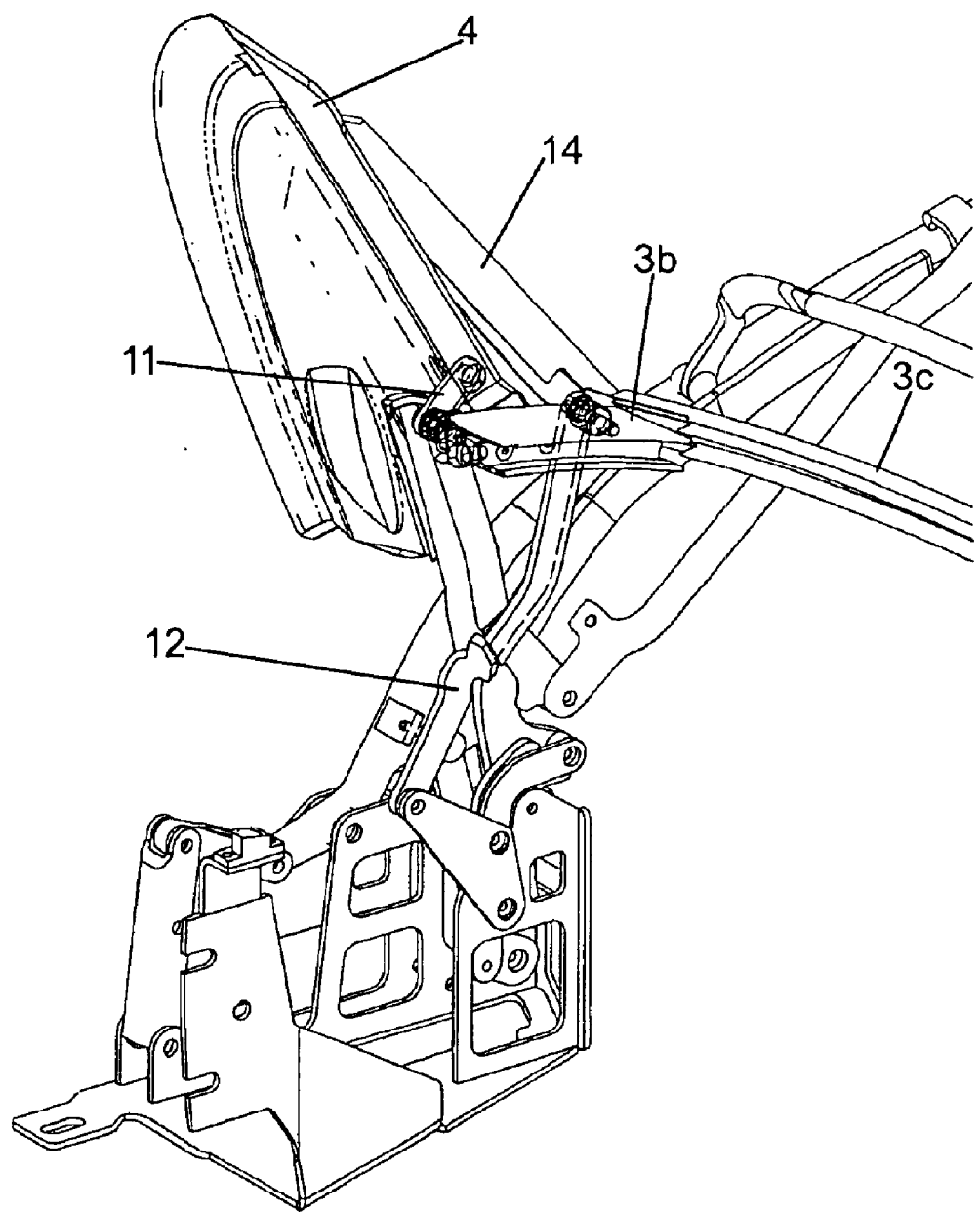
FIG. 6 shows the top from FIG. 5 in a first step of a top-opening movement.
Figure 7:
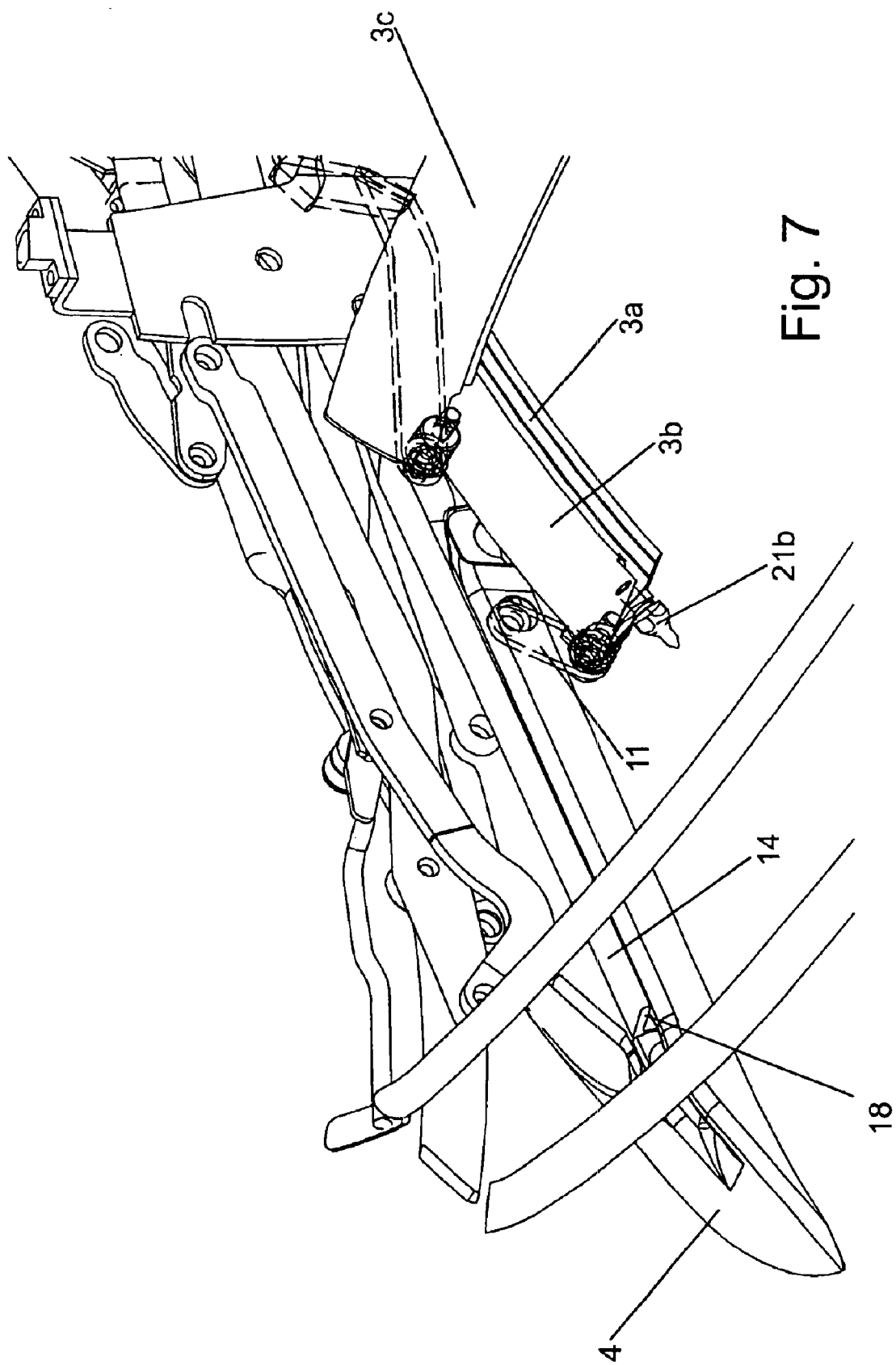
FIG. 7 shows the top from FIG. 5 in an open state of the top.
Figure 8:
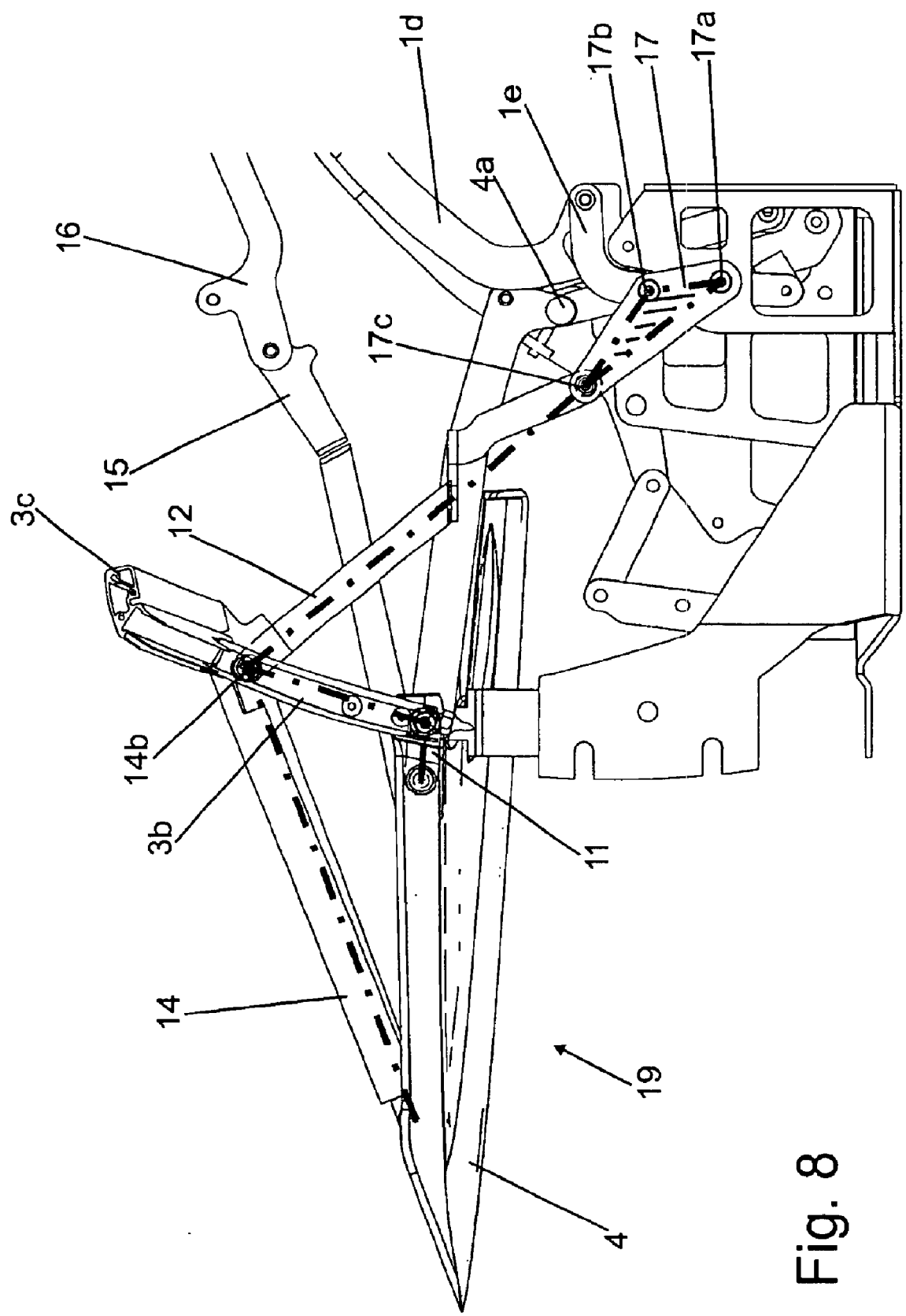
FIG. 8 shows a side view of the top from FIG. 5 in a closed state of the top.
Figure 9:
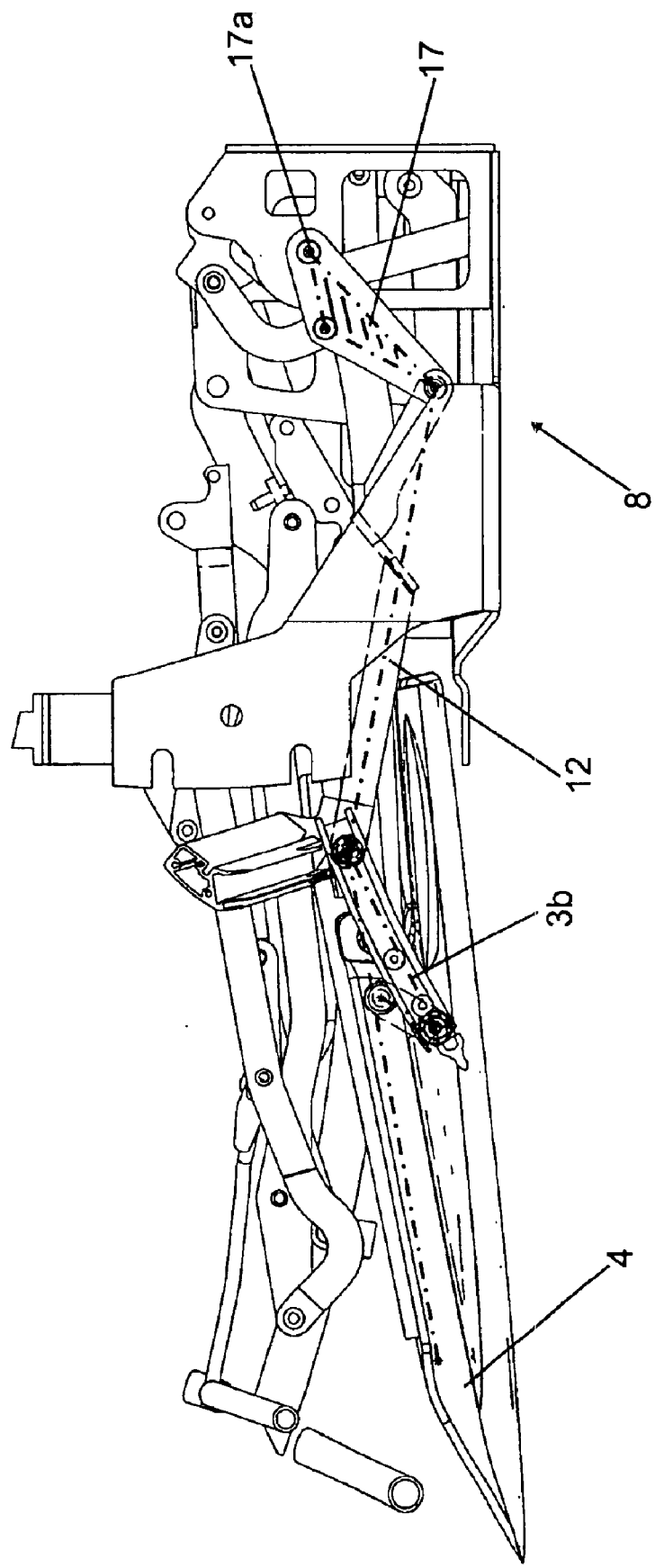
FIG. 9 shows a side view of the top from FIG. 5 in an open state of the top.

In a second step of the top-opening movement, the other positively controlled link mechanism, which comprises especially the main link 1a, the central frame part 1b and the front frame part 1c, is now moved by means of the driving device 9, so that this part of the top linkage 1 is moved in the rear direction of the vehicle with the linkage parts being pivoted with respect to one another in such a manner that a compact folding position of the top is achieved. After this second step of the top-opening movement, the top constitutes a folded-up package of linkage parts which is still, however, in a position in which it is pivoted upwards in the direction of travel, as is illustrated in FIG. 6 at least for the positively controlled chain of links comprising the top-cloth tensioning brackets 4. In a third and final step of the top-opening movement, the folded-up package is now lowered into the storage space in which it takes up a folded-up storage position according to FIG. 2 or FIG. 7 and FIG. 9. In this case, the link plate 17 is pivoted about the joint 17a via which it is articulated on the main bearing 8.

Figure 2:
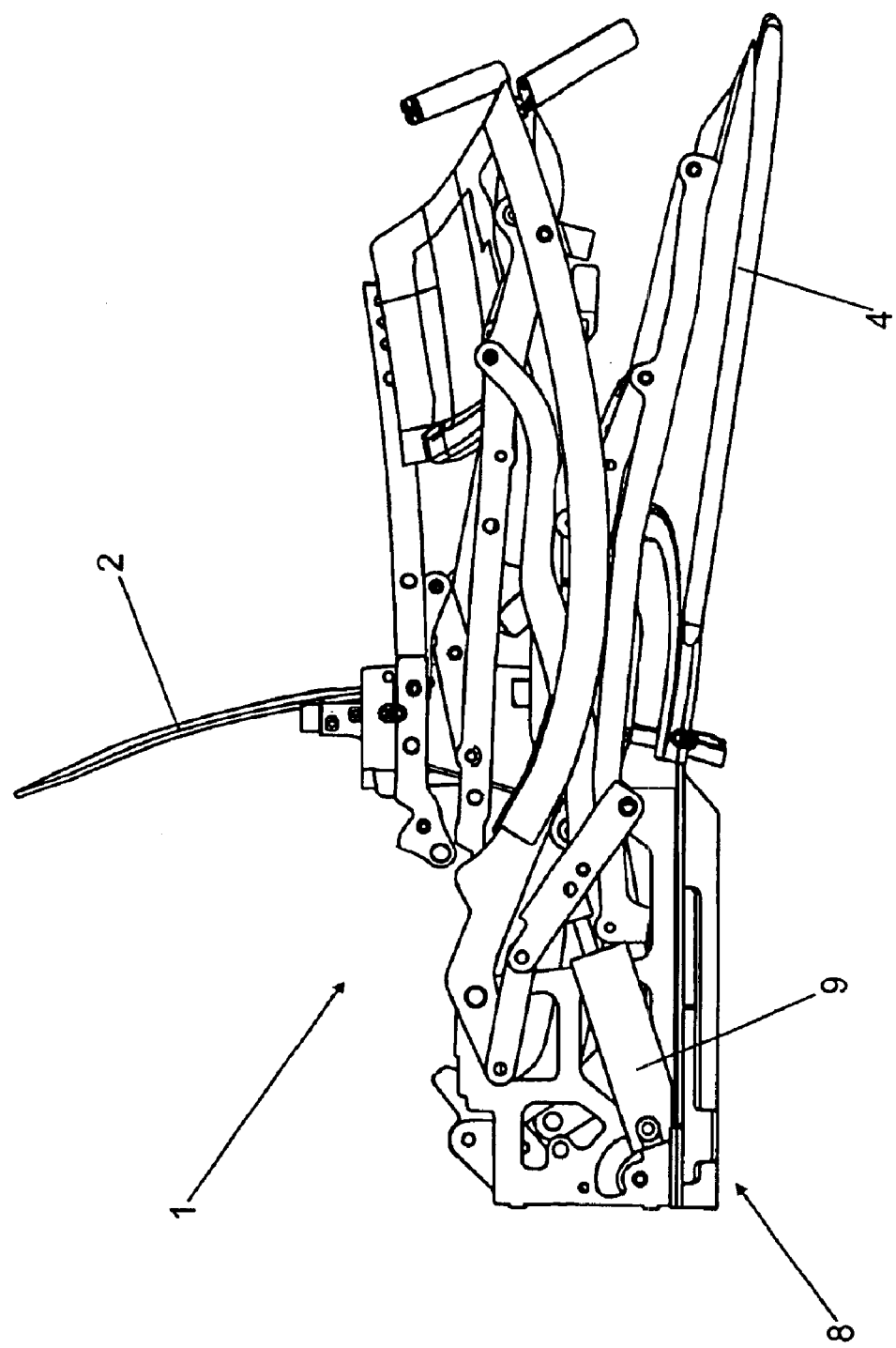
FIG. 2 shows a side view of the top from FIG. 1 in an open state of the top with a rear window in a raised state.

In this storage position, there is now the possibility of raising the rear window 2 again. This position is illustrated in FIG. 2. In this position, the rear window 2 can advantageously take on the function of a windbreak, as a result of which the occupants of the convertible vehicle are not affected by very much air turbulence even in the open state of the top.

The corresponding closing process of the top according to the present invention runs in the reverse sequence of the previously described kinematics.

What is claimed is:

1. A top for a convertible vehicle moveable between an open state and a closed state, comprising:
    a flexible top fabric;
    a top linkage;
    a laterally disposed top-cloth tensioning bracket; and
    a fin link including an inherently rigid structural part configured to bear longitudinal and tensile loads, the fin link connected in an articulated manner on a rear end of the top-cloth tensioning bracket,
    wherein, in the closed state, the top-cloth tensioning bracket is part of a fin of the top and the fin link supports the top-cloth by acting on the top-cloth in a supporting manner,
    wherein the fin of the top includes an essentially fin-like, rear-side formation of the top.

2. The top as recited in claim 1, wherein, in the closed state, the fin link and the top-cloth tensioning bracket form parts of a triangle.

3. The top as recited in claim 1, wherein during a movement of the top between the open and closed state, the fin link is pivotable toward the top-cloth tensioning bracket.

4. The top as recited in claim 1 wherein, in the open state, the fin link is disposed parallel to the top-cloth tensioning bracket.

5. The top as recited in claim 1, further comprising a tensioning rod and a counterpart to the tensioning rod, wherein, in the closed state, the tensioning rod and the counterpart are disposed beyond dead center and support the top-cloth tensioning bracket.

6. A top for a convertible vehicle moveable between an open state and a closed state, comprising:
    a bow link;
    a flexible top fabric;
    a top linkage;
    a laterally disposed top-cloth tensioning bracket; and
    a fin link including an inherently rigid structural part configured to bear longitudinal and tensile loads, the fin link connected in an articulated manner on a rear end of the top-cloth tensioning bracket,
    wherein, in the closed state, the top-cloth tensioning bracket is part of a fin of the top and the fin link supports the top-cloth; and
    wherein in the closed state, the bow link, the fin link and the top-cloth tensioning bracket, form a triangle.

7. The top as recited in claim 6, wherein in the open state, the bow link is disposed parallel to the fin link.

8. The top as recited in claim 6, further comprising an upper segment of a rear window frame rigidly connected to the bow link and wherein a rear end region of the top fabric is fixed on the upper segment.

9. The top as recited in claim 1, further comprising lateral element configured to form a lateral frame region of a rear window, wherein, in the closed state, the lateral frame region is vertically disposed.

10. The top as recited in claim 9, further comprising an intermediate link connected in an articulated manner to the top-cloth tensioning bracket and to the lateral element in such a manner that the fin link, the top-cloth tensioning bracket, the lateral element and the intermediate link form a four-bar linkage.

11. The top as recited in claim 1, further comprising a rigid, movably mounted rear window movable between a lowered and a raised rear window position in both the open and closed state, and a rear window frame connected to the top linkage, the rear window frame disposed in a pivoted-up position in the closed state and pivotable to a storage position in the open state, such that the rear window frame pivots away from the rear window when the top moves from the closed to the open state.

12. The top as recited in claim 11, wherein in the closed state of the top and the raised window position, the rear window engages in a groove-like recess of the rear window frame.

13. The top as recited in claim 11, further comprising a further top-cloth tensioning bracket disposed laterally, the top-cloth tensioning bracket and the further top-cloth tensioning bracket being connected to a rearward end region of the top linkage.

14. The top as recited in claim 13, wherein the rear window frame is disposed between the top-cloth tensioning bracket and the further top-cloth tensioning bracket.

15. The top as recited in claim 11, wherein the rear window frame includes a plurality of segments movable with respect to one another.

16. The top as recited in claim 15, wherein the rear window frame includes two laterally disposed segments, and a third segment disposed transversely to a direction of travel, and wherein, in the closed state, the two segments hold side edges of the rear window in a tight-fitting manner and the third segment holds an upper edge of the rear window in a tight-fitting manner.

17. The top as recited in claim 11, wherein the rear window is mounted in a housing connected to a body of the convertible vehicle.

18. The top as recited in claim 17, wherein the rear window is moveable relative to the housing by means of a drive and a guide rail.

19. The top as recited in claim 11, wherein the top linkage is a positively controlled link mechanism.

20. The top as recited in claim 19, wherein the link mechanism includes, on each side of the vehicle, a main link, a central frame part and a front frame part.

21. The top as recited in claim 11, wherein the top linkage includes two positively controlled link mechanisms, the rear window frame connected to one of the link mechanisms.

22. The top as recited in claim 11, wherein the top linkage includes a front bow, and wherein in the closed state, the front bow is detachably fixed on a front window frame.

23. The top as recited in claim 11, wherein a rearward end region of the top fabric is fixed on the rear window frame.

24. The top as recited in claim 11, wherein the top linkage includes a main bearing unit.

25. The top as recited in claim 11, wherein the top linkage is driveable by means of a driving device.

26. The top as recited in claim 1, further comprising a front bow connected via a plurality of control links to the top-cloth tensioning bracket in such a manner that the top-cloth tensioning bracket is pivoted upward at the same time as the front bow is pivoted upward.

27. The top as recited in claim 1, wherein the fin link supports the fin of the top.

28. The top as recited in claim 1, wherein the fin link forms an obliquely downwardly sloping upper edge of the fin of the top.

29. A top for a convertible vehicle moveable between an open state and a closed state, comprising:
   a flexible top fabric;
   a top linkage;
   a laterally disposed top-cloth tensioning bracket;
   a fin link including an inherently rigid structural part configured to bear longitudinal and tensile loads, the fin link connected in an articulated manner on a rear end of the top-cloth tensioning bracket; and
   a shell part detachably connected on the fin link to support the fin,
   wherein, in the closed state, the top-cloth tensioning bracket is part of a fin of the top and the fin link supports the top-cloth.

30. The top as recited in claim 1, further comprising a shell part detachably connected to the top-cloth tensioning bracket to support the fin.

31. The top as recited in claim 1, wherein the fin link is connected in an articulated manner at fixing points on opposite ends of the fin link, a distance between the articulated fixing points being unchanged during an opening movement of the top.

* * * * *